W. T. JOHNSTON,

Assignor to JOHNSTON RUFFLER CO.

Ruffling Attachment for Sewing Machines.

No. 9,712. Reissued May 17, 1881.

*Witnesses:*

E. E. Masson

Philip Mauro

*Inventor:*

William T. Johnston by A. Pollok his attorney

N. PETERS, Photo-Lithographer, Washington, D. C.

UNITED STATES PATENT OFFICE.

WILLIAM T. JOHNSTON, OF OTTUMWA, IOWA, ASSIGNOR TO JOHNSTON RUFFLER COMPANY, OF SAME PLACE.

RUFFLING ATTACHMENT FOR SEWING-MACHINES.

SPECIFICATION forming part of Reissued Letters Patent No. 9,712, dated May 17, 1881.

Original No. 131,277, dated September 10, 1872. Application for reissue filed December 15, 1880.

*To all whom it may concern:*

Be it known that I, WILLIAM T. JOHNSTON, of Ottumwa, Iowa, have invented certain new and useful Improvements in Ruffling Attachments for Sewing-Machines, of which improvements the following specification is a full description.

This invention relates particularly to that class of ruffling or gathering attachments which are operated from the needle-bar of a sewing-machine, and in which the motion is communicated to the gathering-blade positively in both directions, and it has for its object to produce an improved attachment of this character, simple, durable, compact, and efficient.

The invention consists in the devices for supporting and operating the gathering-blade, which works under the presser-foot of the sewing-machine, and it comprises the following features: first, the vibratory lever, which carries the gathering-blade, operated from the needle-bar positively in both directions by the aid of a second lever, the said levers being pivoted to the frame of the attachment at the same point, and being adjustable in relation to each other to vary the throw of the first-named lever and the attached gathering-blade; second, the two pivoted arms or levers for operating the gathering-blade, arranged to extend respectively above and below a projection on the needle-bar, and adjustably connected with each other, so that the distance between them can be varied and the projection on the needle caused to strike them sooner or later in its reciprocation; and, third, the combination of all the elements indicated.

In order that the invention and the manner of carrying it into effect may be fully understood, the same will now be described in connection with the accompanying drawings, which form a part of this specification and represent a ruffling attachment embodying the invention.

Figure 1:
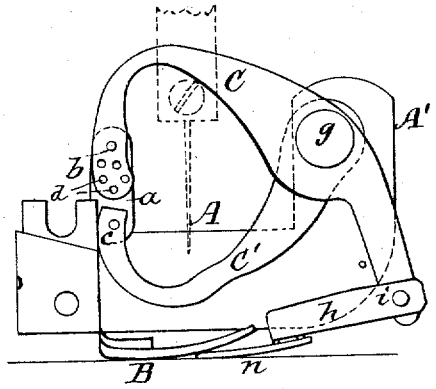
Figure 2:
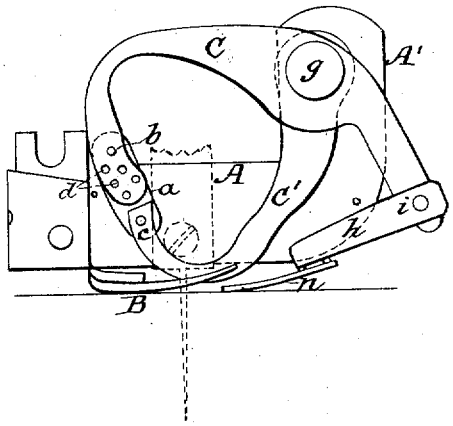
Figure 3:
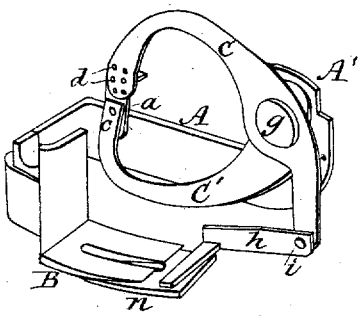

Figure 1 is a view, in side elevation, of the attachment as it appears when the needle-bar is raised to its highest point; Fig. 2, a similar view, with the needle-bar at the bottom of its stroke, and Fig. 3 a perspective view.

Similar letters of reference indicate like parts on all the figures.

A A′ represent the frame of the attachment, and at one end of it the presser-foot B is secured. The two levers or arms C C′ are pivoted to the standard portion A′ of the frame at *g*, so as to be capable of vibrating thereon in vertical planes, and they are adjustably connected, so that the ends next the needle-bar can be brought nearer together or moved farther apart. A plate, *a*, pivoted at *c* to the lower arm or lever, C′, and attached to the upper arm or lever, C, by a movable pin, *b*, secured to said plate *a*, serves as the medium of connection for the two arms, the adjustment being effected by placing the pin *b* in one or another of the holes *d*. (Represented in the end of the arm or lever C.) The vibratory arms or levers C C′ are suitably curved, as shown.

The gathering-blade is carried by the lower end of the lever C and works under the presser-foot B. It is formed of a thin piece of metal, *n*, secured at one end to an arm, *h*, which is itself attached to the lower end of the lever or vibratory arm C by means of a pivot, *i*, and at the outer or free end is forked or slotted, as usual. As shown, the gathering-blade is slightly curved and works against the bottom of the presser-foot.

A projection on the needle-bar (shown as the head of the needle-screw) works between the arms or levers C C′, and as it strikes the one or the other forces the lever C and the gathering-blade attached thereto forward or backward.

It will be seen from an examination of the drawings that the needle passes through and holds the several gathers or folds of the ruffle, after they are formed, before the gatherer-blade is caused to recede from them.

By bringing the ends of the arms or levers C C′ next the needle-bar nearer together the fullness of the gathers is increased, the projection on the needle-bar or the head of the needle-screw striking the levers at greater distances from the ends of its stroke, and by separating the ends of the arms or levers the reverse effect is produced.

The attachment may be detached from the presser-foot of the sewing-machine, and may be secured to the cloth-plate or to the overhanging bracket of the machine, the gathering-blade being arranged to work between the presser-foot and cloth-plate, and the operating-levers being arranged so that the head of the needle-screw on the needle-bar works between and strikes them alternately.

Having now described the said invention, and the manner of carrying the same into effect, what I claim is—

1. The combination, with the gathering-blade of a ruffling attachment, of a vibratory lever carrying the said blade at its lower end, and operated from the needle-bar of the sewing-machine positively in both directions by the aid of a second lever, both levers being pivoted at the same point to the frame of the attachment, and being adjustable in relation to each other, so as to vary the throw of the first-named lever and the gathering-blade carried thereby, substantially as described.

2. As means for operating the gathering-blade of a ruffling attachment, two arms or levers, pivoted to the frame of the attachment, arranged to receive between them a projection on the needle-bar of a sewing-machine, and adjustably connected with each other, substantially as described.

3. The combination of two arms or levers pivoted at a common point to the frame of a ruffling attachment, and arranged to receive between them a projection on the needle-bar of a sewing-machine for operation, a gathering-blade attached to and carried by the lower end of one of said arms or levers, and means for adjustably connecting the said levers with each other, said gathering-blade being operated positively in both directions by contact of the projection on the needle-bar with said levers, substantially as described.

In testimony whereof I have signed this specification in the presence of two subscribing witnesses.

WILLIAM T. JOHNSTON.

Witnesses:
J. E. JOHNSTON,
GEO. GRISWOLD.